(12) United States Patent
Mäurer et al.

(10) Patent No.: US 7,935,736 B2
(45) Date of Patent: May 3, 2011

(54) METHOD FOR RECYCLING POLYESTERS OR POLYESTER MIXTURES FROM POLYESTER-CONTAINING WASTE

(75) Inventors: Andreas Mäurer, Freising (DE); Udo Knauf, Munich (DE); Gerd Wolz, Starnberg (DE); Michael Frankl, Munich (DE); Otto Beck, Langenbach (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 36 days.

(21) Appl. No.: 11/547,115

(22) PCT Filed: Apr. 13, 2005

(86) PCT No.: PCT/EP2005/003894
§ 371 (c)(1),
(2), (4) Date: Dec. 19, 2006

(87) PCT Pub. No.: WO2005/100460
PCT Pub. Date: Oct. 27, 2005

(65) Prior Publication Data
US 2007/0265361 A1    Nov. 15, 2007

(30) Foreign Application Priority Data

Apr. 15, 2004    (DE) .......................... 10 2004 018 287

(51) Int. Cl.
*C08J 11/04*    (2006.01)
(52) U.S. Cl. ............. 521/48; 521/40; 521/40.5; 521/41; 521/44; 521/44.5; 521/48.5; 528/271; 528/272; 528/308.1; 528/308.2; 528/308.6; 528/480; 528/481; 528/491; 528/502 R; 528/502 A; 528/503

(58) Field of Classification Search ................. 521/40.5, 521/40, 41, 44, 48, 49.5, 44.5, 48.5; 528/271, 528/272, 480, 481, 502 C, 502 R, 503, 308.1, 528/308.2, 308.6, 491, 497, 502 A; 428/480
See application file for complete search history.

(56) References Cited

U.S. PATENT DOCUMENTS

| 3,696,058 | A |   | 10/1972 | Teti et al. |
| 3,701,741 | A |   | 10/1972 | Meyer et al. |
| 4,003,880 | A |   | 1/1977 | Sidebotham et al. |
| 5,554,657 | A | * | 9/1996 | Brownscombe et al. ....... 521/48 |
| 5,866,622 | A |   | 2/1999 | Everhart et al. |

(Continued)

FOREIGN PATENT DOCUMENTS

EP    0 742251 A1    11/1996
(Continued)

OTHER PUBLICATIONS

ISR for PCT/EP2005/003894, Apr. 13, 2005, Maurer et al.
(Continued)

*Primary Examiner* — James Seidleck
*Assistant Examiner* — Frances Tischler
(74) *Attorney, Agent, or Firm* — Matthew B. Dernier, Esq.; Gibson & Dernier LLP

(57) ABSTRACT

The invention relates to a method for recycling polyesters or polyester mixtures from polyester-containing waste, in which the polyester or the polyester mixture is dissolved in a solvent and subsequently free-flowing particles are precipitated herefrom with a precipitant. The precipitant is thereby chosen such that subsequent separation of precipitant and solvent is made possible in a simple manner.

14 Claims, 2 Drawing Sheets

U.S. PATENT DOCUMENTS

2003/0119925 A1 6/2003 Vandenhende et al.
2003/0191202 A1* 10/2003 Maurer et al. ................. 521/40

FOREIGN PATENT DOCUMENTS

| | | |
|---|---|---|
| EP | 0850982 B1 | 2/2004 |
| JP | 03152137 A | 6/1991 |
| WO | WO01/36523 | 5/2001 |
| WO | WO02/059189 A2 | 8/2002 |

OTHER PUBLICATIONS

J. G. Poulakis, C. D. Papaspyrides: Dissolution/Reprecipitation: A Model Process for PET Bottle Recycling, Journal of Applied Polymer Science, vol. 81, 91-95 (2001).

International Preliminary Report on Patentability and Written Opinion of International Application No. PCT/EP2005/003894, filed Apr. 13, 2005.

* cited by examiner

METHOD FOR RECYCLING POLYESTERS OR POLYESTER MIXTURES FROM POLYESTER-CONTAINING WASTE

BACKGROUND

The invention relates to a method for recycling polyesters or polyester mixtures from polyester-containing waste, in which the polyester or the polyester mixture are dissolved in a solvent and subsequently free-flowing particles are precipitated herefrom with a precipitant. The precipitant is thereby chosen such that subsequent separation of precipitant and solvent is made possible in a simple manner.

With increasing use of polyethylene terephthalate (PET) packaging applications, in particular in film and bottle applications, ever greater quantities of polluted highly-coloured PET waste occur, which must be disposed of or recycled.

Colourless transparent PET materials, for example returnable and non-returnable applications for mineral water or soft drinks, can be reprocessed by means of conventional material recycling methods (comminution, washing, vacuum-drying, if necessary solid phase post-condensation) in such a manner that even re-use is possible. In problematic applications, such as food packaging, there is no process for mixed coloured and partially opaquely pigmented post-consumer PET waste (including blends and composites) which makes PET re-use as food packaging technically possible.

In addition to the conventional material recycling methods, solvent-based methods have been developed in the last few years for PET in addition to known solvolysis methods (degradation of the polyester into monomer units), J. G. Poulakis, C. D. Papaspyrides: Dissolution/Reprecipitation: A Model Process for PET Bottle Recycling, Journal of Applied Polymer Science, Vol. 81, 91-95 (2001), EP 0 850 982, DE 100 177 07, U.S. Pat. No. 5,866,622. At least the last-mentioned method represents a partial solvolysis due to the unavoidable molar mass degradation there.

A method is known from EP 0 742 251 for reclaiming polyester polymer from a mixed polymer recycling flow, which comprises bringing the polymer mixture into contact with a chemical washing solvent and separating the contaminated chemical washing solvent resulting therefrom from the remaining mixed polymer recycling flow, bringing the remaining mixed polymer recycling flow into contact with a further polyester-dissolving solvent, separating the polyester-containing selective solvent from the non-dissolved residue and separating the thus obtained polyester. When using the chemical washing solvent described here, the problem occurs here however that the partial dissolution of the PET cannot be prevented.

Conventional material recycling methods just like the existing solvent-based methods involve the disadvantage that only inadequate separation of foreign polymers and other undesired disruptive materials, such as e.g. degradation products, additives, fillers or filler residues is possible. Hence high-quality material recovery of PET waste from mixed waste (so-called post-consumer collections) is prevented.

A further disadvantage is based on the fact that the methods known from the state of the art require thermal processing of the solvent and precipitant which are used. This is connected consequently to a high energy requirement for this method.

SUMMARY OF THE INVENTION

Starting from these disadvantages of the state of the art, it was the object of the present invention to provide a method for recycling polyesters or polyester mixtures which makes it possible to separate foreign polymers and to reduce the proportion of disruptive material significantly. The energy requirement of the method and hence the costs thereof are thereby intended to be kept low.

According to one or more embodiments of the invention, a method for recycling polyesters or polyester mixtures from polyester-containing waste is provided with the following steps: a) friction washing of the waste with a solvent for the polyester or the polyester mixture, b) dissolving the polyester in a solvent, and precipitating free-flowing particles of the polyester or of the polyester mixture with a precipitant.

The special feature of the method according to one or more aspects of the invention is based on the fact that, during precipitation, the precipitant mixes with the solution of the polyester or polyester mixture in a single phase and, during subsequent cooling, the precipitant and the solvent separate into two phases. Due to separation into two phases, simple separation of precipitant and solvent is made possible, which can be used again for the method subsequently without further processing. Hence a thermal processing which has been used to date in the state of the art is also extensively reduced. As a result, a particularly energy-saving and cost-efficient method implementation is made possible.

Preferably, mixing of the solution of the polyester or polyester mixture with the precipitant is effected with precipitation at a temperature of about 180 to 220° C. Subsequently the system is then cooled to about 50 to 120° C., the result being at the same time the formation of two liquid phases.

Preferably, the two phases are then separated mechanically and can be re-used thus for the method.

Non-polar substances are used as preferred precipitant. Amongst those, particularly aliphatic alkanes, in particular n-alkanes or iso-alkanes are preferred.

The PET solution is precipitated by addition of the precipitant so that free-flowing PET particles are produced. Since the precipitated particles have a high bulk density with a simultaneously high surface-volume ratio, they are suitable in particular for a subsequent diffusion-controlled solid phase post-condensation.

The addition of precipitant according to one or more embodiments of the invention confers the advantage that subsequent time-intensive post-crystallisation within the solid phase post-condensation process can be dispensed with. Furthermore, the precipitation process according to the invention is significantly more economical. Whilst the precipitation product of a thermal precipitation, which cannot be de-watered mechanically and has a dry substance of approximately 30% (70%, i.e., 2.33 times the quantity of solvent must be distilled over), the dry substance of the mechanically pressed recyclate precipitated with precipitant is approximately 75%, i.e., only 0.3 times the solvent quantity must be thermally processed. This advantage is achieved with only 10% by weight of the precipitant, relative to the PET solution.

A further advantage of the addition of precipitant according to one or more aspects of the invention is based on the fact that, in the case of a mixture of solvent and precipitant which is single-phase at high temperature, any polyolefin residues which are possibly present are dissolved and then precipitate during cooling and are collected between the two liquid phases. Since the precipitated PET sediments as a sinking fraction, further separation for quality improvement is readily possible.

Surprisingly, it was shown that, by pre-cleaning the waste mixture by means of solvent extraction, the foreign polymers can be effectively separated and the undesired additives or infiltrated disruptive materials can be significantly reduced. By means of dissolution and possibly fine filtration and also subsequent precipitation with a suitable precipitant, the undissolved inert particles, fillers and possibly further disruptive materials can be separated and the low-molecular soluble substances can be further minimised so that a pure PET recyclate is produced which can subsequently be processed as new material. The method is thereby particularly economical due to the low energy requirement during solvent processing.

Preferably, the friction washing is implemented with a solvent for the polyester or the polyester mixture at a lower temperature than the dissolution temperature. The temperature of the friction wash is thereby particularly preferably in the range between about 50 and 150° C. and particularly preferred between about 100 to 120° C.

Preferably a dibasic ester (hereinafter referred to as "DBE"), such as, but not limited to, dicarboxylic acid dialkyl ester, or the like, or a dicarboxylic acid dialkyl ester (DBE) mixture is used as solvent. Amongst these, dialkyl ester, in particular dimethyl ester or diethyl ester of oxalic acid, maleic acid, succinic acid, glutaric acid and/or adipinic acid are preferred. The ratio of solid to liquid is thereby preferably between about 1:1 to about 1:4, the particularly preferred ratio being 1:2.

Due to the friction washing, the PET moisture is reduced, which means that the reduced hydrolysis effects a lower molar mass degradation during processing. Furthermore, foreign polymers such as polystyrene (PS) and polyvinyl chloride (PVC) are dissolved. These can be separated by means of conventional density separation generally only inadequately from PET fractions. It is likewise possible to separate composites, e.g. trays, blisters or multilayer bottles. By swelling the PET matrix, the soluble disruptive materials, e.g. colour additives, are in addition extracted substantially more effectively than with a hot water wash.

The friction washing concerns intensive washing with a high input of turbulence and friction energy through the agitators which are used. The friction washing confers an advantage which is essential to the invention in that also the polymer composites (PET/PE, PET/PE/PA) contained in many cases in the PET mixed waste are accessible by dissolving the composite of a subsequent density separation, e.g., float-sink separation.

In a preferred embodiment of the method, before dissolution of the polyester or polyester mixture in a solvent, friction washing of the waste with the solvent is implemented for the polyester or polyester mixture. This is possible in particular when recycling composite systems, e.g. trays, sealable deep-drawn composite films or bottles comprising PET composite systems. This frequently concerns multilayer systems which comprise a PET layer which is glued in turn to a further polymer layer. The method is now orientated such that the friction washing is implemented at a temperature which, on the one hand, does not allow dissolution of the polymers but, on the other hand, does dissolve the adhesive. This leads to the fact that the polymer of the composite system which is different from PET can be separated by subsequent density separation, e.g. float-sink separation.

As a second pre-cleaning step, preferably a density separation in the solvent can be implemented, firstly the waste being rinsed and filling up to a ratio between solids and liquid of 1:4 being effected. The undissolved polyolefins which are released from the composite materials are then separated as floating fraction. This type of composite separation is not achievable with the methods known to date.

The dissolution of the polyester in the solvent is effected analogously, as described in DE 100 17 707, the disclosure content of which is referred to here expressly. In accordance with one or more embodiments of the invention, it is preferred that the same solvent is used as during the friction washing, which confers considerable economic advantages with respect to the process.

A further preferred development relative to this method resides however in adding filtration aids to the PET solution for subsequent cleaning.

In an advantageous development, after dissolving the polyester in the solvent, the undissolved inert particles, e.g. aluminium, polyamide, glass, sand etc. are filtered out of the solution. Subsequently, fine filtration or gravity separation of the fillers (and if necessary further disruptive materials) is then effected, with the filtration aid.

Other aspects, features, and advantages of the present invention will be apparent to one skilled in the art from the description herein taken in conjunction with the accompanying drawings.

BRIEF DESCRIPTION OF THE DRAWING

The subject according to the application is intended to be explained in more detail with reference to the following Figures and the following example without restricting said subject, however, to the breadth of the embodiment.

DETAILED DESCRIPTION OF THE INVENTION

Figure 1:
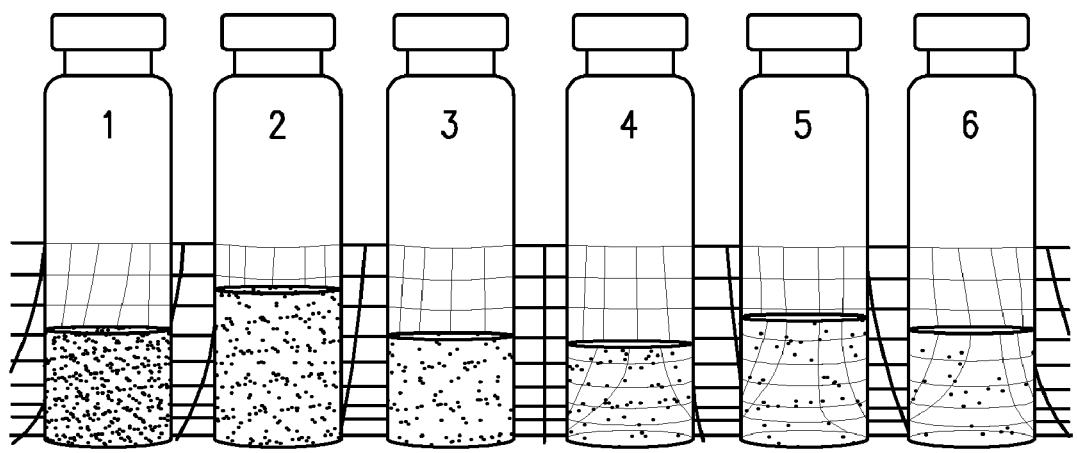
FIG. 1 illustrates six PET samples which were treated according to different processing methods.

FIG. 1 illustrates six PET samples which were treated according to different processing methods, in which: sample 1=recyclate from PET mixed waste without filtration and DBE postwashing; sample 2=recyclate from PET mixed waste without filtration with DBE post-washing or pressing; sample 3=recyclate from PET mixed waste filtered with folded paper filter; sample 4=recyclate from PET mixed waste with pressure filtration through $CaCO_3$, wax; sample 5=recyclate from PET mixed waste with pressure filtration through $CaCO_3$ and alkane precipitation; and sample 6=reference PET, white returnable bottle shredder.

It is noted that 10% TFA solutions of all products were applied to the samples.

Figure 2:
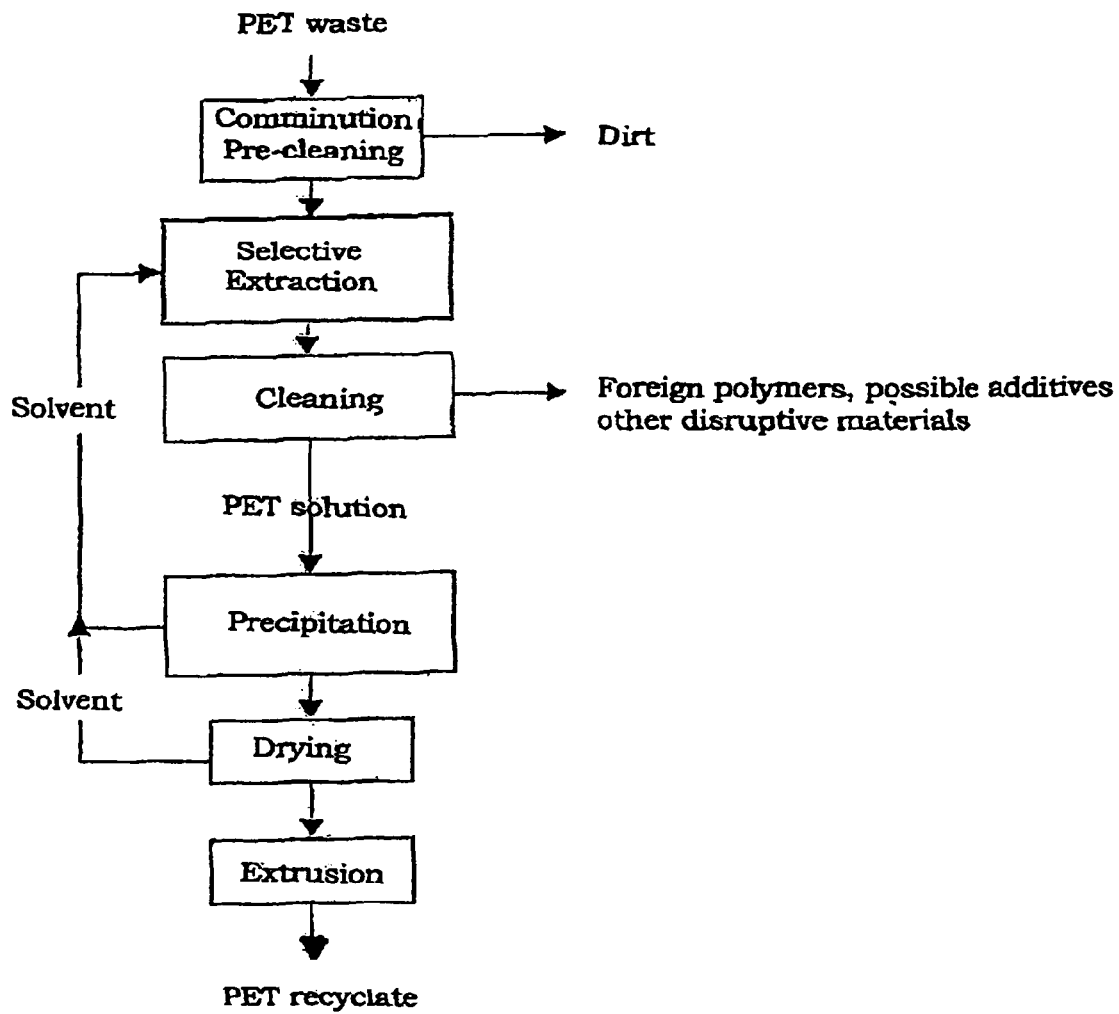
FIG. 2 shows a flow chart of the method steps according to one or more embodiments of the invention.

In the subsequent example, details of the method steps, including the method steps as shown in FIG. 2, are discussed in detail. The pre-cleaning is implemented in two stages in the form of a friction washing and subsequent float-sink separation.

Friction Washing:

In order to separate the PVC and soluble foreign polymer residual content and also to remove further impurities, such as e.g., dust and ultrafine particles, extractions of the PET waste with DBE significantly below the PET dissolving temperature and with input of sufficient agitation energy are implemented. This friction washing is effected in a temperature-controllable double-wall glass vessel with a base outlet and with an effective volume of 1 l at respectively constant temperature (105° C. during DBE extraction). The S/L ratios are set at 1:2 (200 g flakes plus 400 g solvent). For the agitation, a 2-blade agitator with 60 mm diameter is available, which agitator is positioned at 25 mm spacing from the container base and is operated by means of an agitator drive at 500 rpm. After 60 min. extraction duration, the agitator is switched off and the solution containing foreign polymers is drawn off.

Result: Relative to the initial weight of the polymer, an extractable foreign polymer proportion of approximately 7% is produced for the PET mixture. A second postextraction step is not worthwhile and is implemented merely as postrinsing without fairly long dwell times in the subsequent float-sink separation.

Float-Sink Separation:

The float-sink separation is effected in the same 1-l glass container as the friction washing. The moist PET flakes are filled with DBE up to an S/L ratio of 1:4 (washed flakes plus 800 g solvent). Because of their lower density, the first polyolefin flakes thereby rise upwards already and accumulate on the liquid surface. The 2-blade agitator is operated such that a predominantly laminar flow is formed and the upwardly moving polyolefin flakes are not "agitated-in" again downwards. The speed of rotation is approximately 50 rpm. The polyolefins which float upwards are skimmed off the surface by means of a sieve.

Result: After weighing out the separated flakes, the polyolefin proportion was determined at 2%.

Dissolution ("Selective Extraction"):

475 g DBE and 5 g $CaCO_3$ are added to a 1-litre, three-neck flask. The suspension is gassed overnight with nitrogen with constant agitation. After heating to boiling temperature $\theta=207°$ C. (here also permanent gassing with nitrogen), the addition of 25 g PET (pre-cleaned, freeze-dried) is effected with constant agitation. The boiling temperature increases after five minutes to $\theta=212°$ C. The total dissolution time up to filtration is 10 min.

Filtration ("Cleaning"):

The heatable pressure filtration cartridge which is used for the filtration is fitted with a "black band" paper filter onto which a layer of $CaCO_3$ which is approx. 6 mm thick is applied. Subsequently, the filter is heated to $\theta=205°$ C. (oil temperature $\theta=215°$ C.). Subsequently, the filtration of the PET/DBE solution is effected at a differential pressure of 2 bar.

For comparison purposes, both a thermal precipitation and a precipitation with precipitant are implemented.

Thermal Precipitation:

Approximately half of the filtrate was left in an aluminium dish. During subsequent cooling to room temperature, the solution solidifies into a PET gel with wax-like consistency.

Precipitation with Precipitant:

The other half of the filtered solution (approx. 250 ml) is filtered in a preheated three-neck flask. The flask is subsequently heated again to boiling temperature. The precipitation is effected by addition of 25 g of a commercial alkane mixture ($\theta=205°$ C.). During cooling, voluminous flakes are formed at a temperature of $\theta=165°$ C., said flakes solidifying up to the end of the precipitation ($\theta=148°$ C.) into a fine, grit-like deposit.

The filtrates obtained according to the method were glass-clear and of a light green colour. By repeated heating before precipitation, the clear solution became a slightly light brown colour.

For subsequent treatment of the products, i.e., the PET recyclates, two alternatives were chosen. According to the first route, threefold washing of the precipitation product was effected with double the quantity of acetone. The brown colouration was able hereby to be practically completely removed. As a further route, the PET recyclate was pressed out on a screw press up to a dry weight (TS) of 20% to 70%. The pressed-out liquid separates into two separable phases. The brown colouration remained entirely in the solvent.

In the following, the temporal course of the method is represented in Table 1.

TABLE 1

| Time in minutes | Note | Temperature |
|---|---|---|
| 0:00 | Addition of PET | 207° C. |
| 5:00 | | 212° C. |
| 10:00 | Beginning of filtration | |
| 20:00 | End of filtration | |
| 28:00 | Precipitation with alkane | |
| 33:00 | Formation of the first flakes | 165° C. |
| 36:00 | End of precipidation | 148° C. |

Result-evaluation by TFE solutions: 10% TFA solutions of all products were applied (see FIG. 1).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for recycling polyesters or polyester mixtures from polyester-containing waste, comprising:
   dissolving the polyester or polyester mixture in a solvent including one or more of dimethyl ester or diethyl ester of oxalic acid, maleic acid, succinic acid, glutaric acid, and adipinic acid;
   precipitating at least a portion of the polyester or at least a portion of the polyester mixture as free-flowing particles with a precipitant including one or more of non-polar substances, aliphatic hydrocarbons, and mixtures of petroleum, ether and benzenes, such that the precipitant mixes with the solution of the polyester or polyester mixture in a single phase; and
   cooling the polyester or polyester mixture, the precipitant, and/or the solvent to a temperature of 60° C. to 120° C., such that the precipitant and the solvent separate into two liquid phases,
   wherein the two phases are separated mechanically and can be re-used for the method.

2. The method according to claim 1, wherein mixing of the solution with the precipitant is effected with precipitation at a temperature of about 180 to 220° C.

3. The method according to claim 1, wherein mixing of the solution with the precipitant is effected with precipitation at a temperature of about 190 to 212° C.

4. The method according to claim 1, wherein n-alkanes and/or iso-alkanes are used as precipitant.

5. The method according to claim 1, wherein, before dissolution, friction washing of the waste with the solvent is implemented for the polyester or the polyester mixture.

6. The method according to claim 5, wherein one of:
   the friction washing is effected at a lower temperature than the dissolution temperature of the polyester; and
   the friction washing is effected at a temperature between about 50 and 120° C.

7. The method according to claim 5, further comprising, after the friction washing, separating polyolefins as floating fraction by means of density separation.

8. The method according to claim 5, wherein the polyester-containing waste contains composite systems comprising polyester and polyolefins and the friction washing is implemented at a temperature which makes possible the separation of the polyolefins from the polyester or polyester mixture.

9. The method according to claim 1, further comprising adding a filtration aid during dissolution of the polyester or the polyester mixture.

10. The method according to claim 1, further comprising separating, after dissolution of the polyester in the solvent, at least one of: undissolved inert particles, fillers, and further disruptive materials, from the solution by means of solid-liquid separation.

11. The method according to claim 10, wherein the separation of the undissolved inert particles is effected by filtration.

12. The method according to claim 10, wherein the separation of one or more of the fillers and the further disruptive materials is effected by fine filtration and/or gravity separation.

13. The method according to claim 1, further comprising pressing and drying the free-flowing particles from the polyester or the polyester mixture.

14. The method according to claim 1, wherein waste containing polyethylene terephthalate (PET) and/or polybutylene terephthalate (PBT) is used.

* * * * *